Dec. 22, 1970     E. J. CARLO     3,550,053

WELDING TRANSFORMER

Filed May 15, 1969     5 Sheets-Sheet 1

INVENTOR.
ELIOT JOSEPH CARLO
BY George A. Rolston

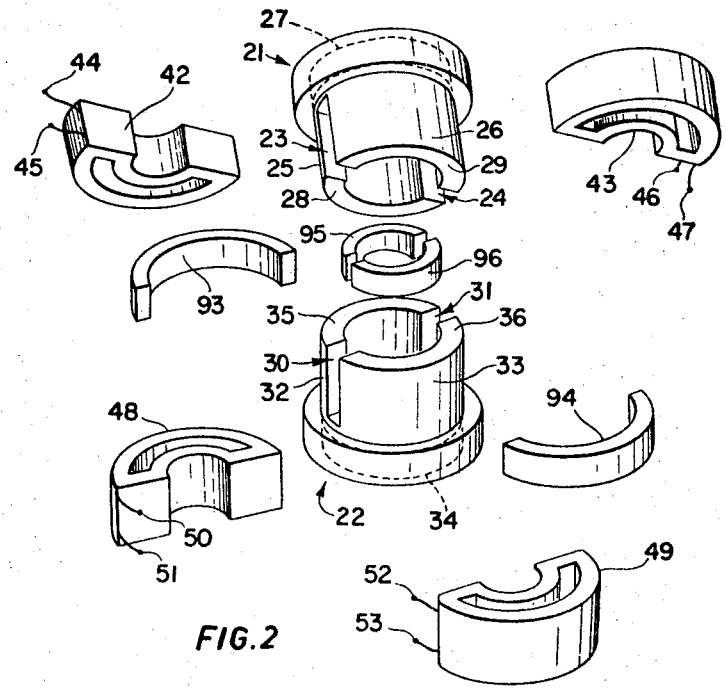
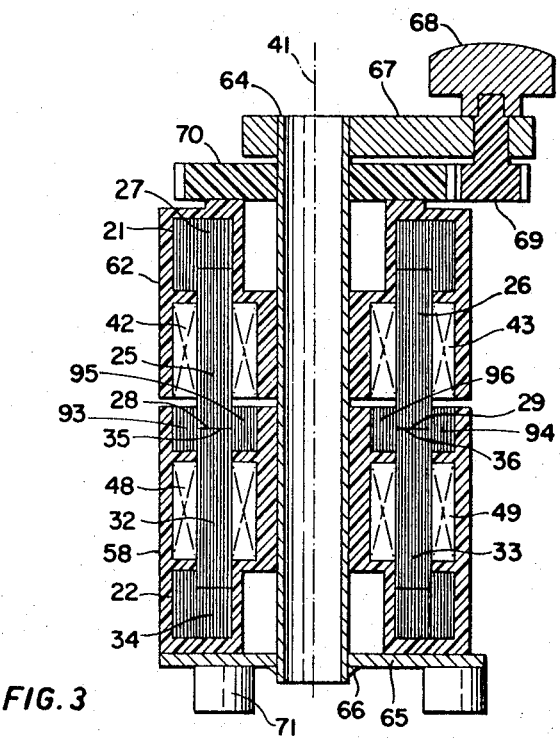
FIG.2
FIG.3

Dec. 22, 1970    E. J. CARLO    3,550,053
WELDING TRANSFORMER

Filed May 15, 1969    5 Sheets-Sheet 3

INVENTOR.
ELIOT JOSEPH CARLO
BY George A. Rolston

Dec. 22, 1970  E. J. CARLO  3,550,053
WELDING TRANSFORMER
Filed May 15, 1969  5 Sheets-Sheet 4

INVENTOR.
ELIOT JOSEPH CARLO
BY George A. Rolston

Dec. 22, 1970 E. J. CARLO 3,550,053
WELDING TRANSFORMER

Filed May 15, 1969 5 Sheets-Sheet 5

INVENTOR.
ELIOT JOSEPH CARLO
BY George A. Rolston

United States Patent Office 3,550,053
Patented Dec. 22, 1970

3,550,053
WELDING TRANSFORMER
Eliot Joseph Carlo, 138 McMurchy St. S.,
Brampton, Ontario, Canada
Filed May 15, 1969, Ser. No. 824,918
Int. Cl. H01f 21/02
U.S. Cl. 336—118                                10 Claims

ABSTRACT OF THE DISCLOSURE

A welding transformer for continuous adjustment of electric magnitudes by means of variable induction, having a pair of cylindrical-shaped core members with a pair of notches on opposite sides of each core member defining spaced apart semi-cylindrical legs joined at one end by a base, at least one field winding on each core member, one core member being rotatable relative to the other core member for mutual angular displacement around a common axis, and a pair of semi-angular bodies of permeable magnetic material arranged opposite to one another and engaging the adjacent legs of the core members that are rotatable relative to the core members. The electrical magnitudes are adjusted by either rotation of the semi-annular bodies relative to the core members or rotation of one core member relative to the other or a combination of both.

---

This invention relates to a control device for providing continuous adjustment of electrical magnitudes, such as amperage and voltage.

In the past, voltages have been controlled in some instances by the use of transformers with primary and secondary windings, mounted upon iron cores, which are movable with respect to one another to vary the induction. However, due to the requirements for such movement, it is only possible to operate such devices in a relatively inefficient manner. In addition, they occupied a great deal of space.

Similarly, earlier devices are known in which amperages have been controlled in a similar manner with the addition of a so-called "magnetic shunt" on the above noted iron cores. These devices are highly expensive and operate in a relatively inefficient manner.

One known form of control device employing movable primary and secondary winding units is disclosed in French Letters Pat. No. 1,517,620. In this device, primary and secondary windings are mounted on a pair of juxtaposed rectangularly-shaped iron cores having spaced apart legs parallel with one another, and the primary and secondary winding units are movably associated end to end with the exposed end faces of their respective iron cores in contact with one another. The magnetic flux lines close through the iron in the exposed end surfaces of the iron cores even during rotation of one iron core relative to the other. While this device appears to be greatly superior to such earlier devices when used in the maximum and minimum positions, practical experiments have proven that it too is subjected to very serious drawbacks. Thus it has been found for example, that when the device is rotated between the maximum and minimum positions, under constant load conditions, and operated in the intermediate position, the device overheats and the device, if not securely locked in position tends to vibrate and hum. As a result, it is necessary to operate the control device on an intermittent basis to prevent overheating. The specific reason for these shortcomings are not fully known, but it is believed to be due to the fact that as the primary and secondary winding units are moved relative to one another, the area of contact between the exposed end surfaces of the juxtaposed legs is changed, and most of the magnetic flux lines are not closed through iron when rotated between the minimum and maximum position. In addition, there may also be other contributing factors such as the factor that the secondary windings themselves, being of generally rectangular shape are not cut by all the induced magnetic flux lines.

Accordingly, it is an object of the present invention to provide a control device of the type described in which cylindrical iron cores are placed in a juxtaposed relationship having spaced apart legs which are curved in a generally semi-cylindrical manner and end surfaces in contact with opposite end surfaces whereby one iron core can be rotated relative to the other and the area of contact between adjacent end surfaces is not appreciably decreased. The primary and secondary windings positioned on the semi-cylindrical legs of the iron cores are formed to conform to the curved shaping of the leg to permit electric current to be generated in the windings by the magnetic flux of lines flowing in the legs of the cores. When one iron core is rotated relative to the other from the minimum to the maximum position, there is a minimal change in area of contact between the end surfaces such that the iron cores will not overheat under load and no load conditions and the vibrations and hum disappear.

It is an object of the present invention to provide a control device having the foregoing advantages which is of reduced size in relation to earlier devices, thereby making it more economical to manufacture and opening up a wide variety of applications.

It is another object of this invention to provide a control device having the foregoing advantages which is readily adaptable to provide different characteristics of a voltage-amperage load curve by rotation of the one iron core relative to the other and also rotation of a magnetic shunt relative to the two stationary iron cores according to the requirements of the job at hand.

It is still another object of this invention to provide a control device having the foregoing advantages and incorporating asymmetric arrangements of secondary windings in such a manner that the output voltage from the inductively coupled secondary windings can be varied by a fixed amount above and below the value of the input voltage into the primary windings.

The foregoing and other objectives will become apparent from the following description of a preferred embodiment of the invention which is given here by way of example only with reference to the following drawings, in which like reference devices refer to like parts thereof throughout the various views and diagrams and in which:

FIG. 2 is an exploded perspective view of the core members and field windings used in the control device;

FIG. 3 is a cross-sectional view taken along the line 3—3 of FIG. 1;

It should be noted that the invention will be described in association with a core type transformer having two legged iron cores, however, the invention can be used in association with other types of transformers including shell type transformers with three phase construction. The field windings will preferably be arranged on the middle leg of each iron core. The number of degrees of rotation of one iron core relative to the other to define the control range of the device can be found by experimentation.

Figures 1, 1A:
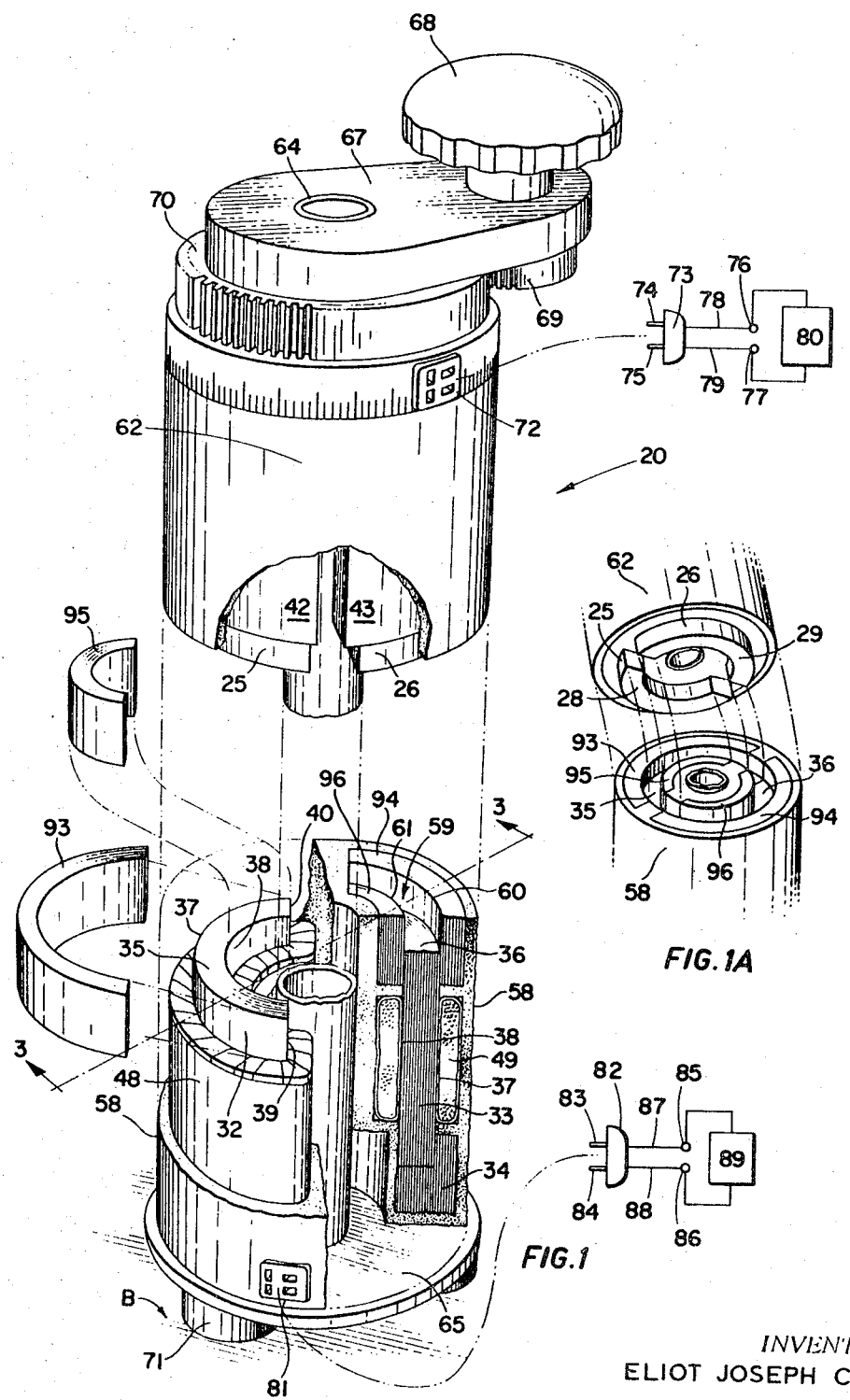
FIG. 1 is an exploded upper perspective view of a control device partly broken away according to the invention.
FIG. 1A is an exploded perspective view of the control device showing the engaging surfaces of the core members.

Referring now to the drawings, FIGS 1 and 2, illustrate a core type transformer indicated by the general character 20. The transformer 20 has a pair of cylindrical core members 21 and 22 with identical diameter, width and depth shown best in FIG. 2. The core members are made from magnetic or electrical conductive material such as strips of high grade silicone steel or the like which have been concentrically wound into a tight circular spiral. The core members will now be referred to as iron cores 21 and 22. Notches 23 and 24 are cut on opposite sides of the core 21 to form a pair of spaced apart semi-cylindrical shaped legs 25 and 26 joined at one end by a base 27. The legs 25 and 26 have exposed end surfaces or polar surfaces 28 and 29 respectively. The iron core 22 has notches 30 and 31 cut on opposite sides of the core 22 to form spaced apart semi-cylindrical shaped legs 32 and 33 joined at one end by a base 34. The legs 32 and 33 have exposed end surfaces or polar surfaces 35 and 36 respectively. The polar surfaces 28, 29, 35 and 36 are preferably identical in area and each is enclosed by spaced apart outer curved edge 37 and inner curved edge 38 which are joined at their free ends by end edges 39 and 40 preferably in the same plane. The iron cores 21 and 22 are arranged for mutual angular displacement around a common axis 41. The iron core 22 will be described as the stationary iron core and iron core 21 will be described as the rotating iron core. The rotating iron core 21 is moved relative to the stationary iron core 22 for angular displacement. It should be noted that it is possible to rotate the iron core 22 relative to the iron core 21 also.

Secondary field windings 42 and 43 shown best in FIG. 2, are kidney-shaped in cross-section and are dimensioned to snugly fit on the semi-cylindrical legs 25 and 26 respectively of the iron core 21. Each field winding 42 and 43 contains an equal number of turns of copper or the like wire therein. The winding 42 has two terminals 44 and 45. The field winding 43 has two terminals 46 and 47. The secondary field windings 42 and 43 are insulated from the rotating iron core 21.

Primary field windings 48 and 49 are kidney-shaped in cross-section and are dimensioned to snugly fit on the semi-cylindrical shaped legs 32 and 33 on the stationary iron core 22. The field windings 48 and 49 have an equal number of turns of copper or the like wire therein. The field winding 48 has two terminals 50 and 51; the field winding 49 has two terminals 52 and 53. The primary field windings 48 and 49 are insulated from the stationary iron core 22.

Preferably the field windings 42, 43, 48 and 49 each have an equal number of turns of copper wire and are arranged symmetrically about the common axis 41 and about the plane of the touching polar surfaces so that the angular displacement of the rotating iron core 10 relative to the stationary iron core 11 provides a substantially linear characteristic of control for current or voltage as desired. The field windings can also be wound asymmetrically about the common axis 41 and the rotational plane of the polar surfaces to provide any desired characteristics of control.

Figure 4:
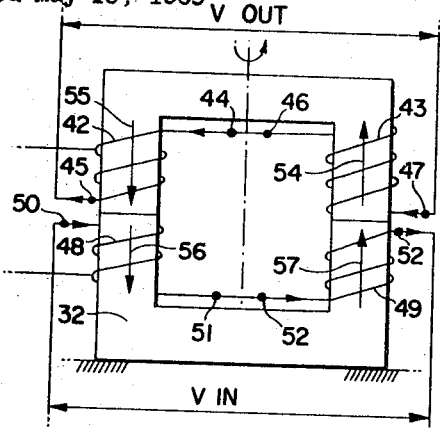
FIG. 4 is a schematic diagram of the field windings inductively coupled on the core members.

The secondary windings 42 and 43 are connected in series by connecting the terminals 44 and 46 and are wound on the legs 26 and 28 in such a manner to induce fields as shown in FIG. 4 by arrows 54 and 55 respectively. The primary windings 48 and 49 are connected in series by joining terminals 50 and 52 and are wound on the legs 32 and 33 in such a manner to induce fields as shown in FIG. 4 by arrows 56 and 57 respectively. The primary windings are shown inductively coupled to the secondary windings in FIGS. 4 and 5.

As shown best in FIG. 1, the stationary iron core 22 with the primary field windings 48 and 49 thereon, are embedded in a cylindrical body 58 preferably made of synthetic resin or the like. A circular groove 59 is formed in the upper portion of the body 58 with parallel side walls 60 and 61 shown best in FIG. 1A. The rotating iron core 21 with the secondary field windings 42 and 43 are embedded in a cylindrical body 62 preferably made of synthetic resin or the like in such a manner that the lower portion of the semi-cylindrical shaped legs 25 and 26 extend outwards from the lower end of the resin body 62 to fit in the circular groove 59 in the cylindrical body 58.

The groove 59 permits the legs 25 and 26 of the rotating iron core 21 to be aligned with the legs 32 and 33 of the stationary iron core 22 when the cylindrical resin body 62 is placed on the cylindrical resin body 58 in a juxtaposed relationship.

The cylindrical shape of the iron cores and the kidney shape of the field windings permits the opening in the center of the cylindrical resin bodies 58 and 62 to be used to hold the cylindrical bodies 58 and 62 rotatably in their juxtaposed relationship. A center post and securing means indicated generally at 63 has a hollow center post 64 extending through the opening in the bodies 58 and 62 along the common axis 41. A flange 65 is connected to the lower end of the post 64 by a securing means 66. The cylindrical resin body 58 is secured to the flange 65 to prevent it from rotating. A rigid member 67 is secured to the upper end of the post 64 with a rotatable knob 68 passed through the free end thereof. A first gear 69 is connected to the lower portion of the knob 68 and has teeth which interengage with teeth on a second gear 70 secured on the cylindrical resin body 62 to permit an operator to rotate body 62 manually by rotating the knob 68. Legs 71 connected to the flange 65 raise the cylindrical body 58 off a base B to permit air to pass through the center opening of the hollow post 64 to cool the windings and iron cores.

The terminals 45 and 47 of the secondary windings 42 and 43 are extended outside the cylindrical resin body 62 to a female socket 72 attached on the outside surface of the cylindrical resin body 62. A plug 73 with prongs 74 and 75 is adapted to be inserted in the socket 72 and connected to the prongs 74 and 75 are load terminals 76 and 77 by lines 78 and 79 respectively. A load 80 is connected to the terminals 76 and 77 thereby connecting the load 80 across the terminals 45 and 47 of the secondary windings 42 and 43.

The terminals 50 and 52 of the primary windings 48 and 49 are extended outside the cylindrical resin body 58 to a female socket 81 attached on the outside surface of the cylindrical resin body 58. A plug 82 with prongs 83 and 84 is adapted to be inserted in the socket 81 and connected to the prongs 83 and 84 and terminals 85 and 86 by lines 87 and 88 respectively. An electrical source 89 is connected to the terminals 85 and 86 thereby connecting the electrical source 89 across the terminals 50 and 52 of the primary windings 48 and 49.

Figure 6:
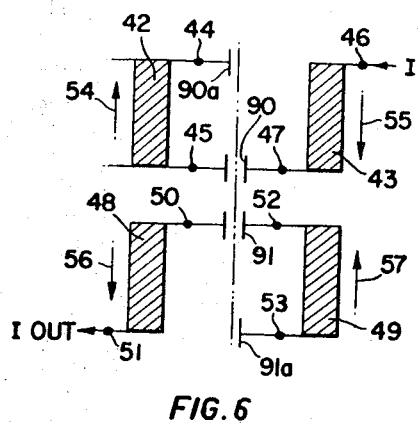
FIG. 6 is a schematic diagram showing the field windings galvanically connected in the control device to control current.
Figure 7:
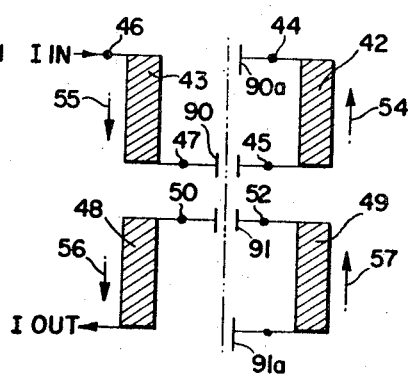
FIG. 7 is a schematic diagram of the field windings galvanically connected in a position 180° from the position shown in FIG. 6.

The primary and secondary field windings can also be galvanically connected to control current and voltage as shown in FIGS. 6 to 9. To control current the terminals are connected as shown in FIGS. 6 and 7. The secondary windings 42 and 43 are connected in series by placing the terminals 45 and 47 in contact with a tube 90 made of copper or the like, attached to the inner surface of the cylindrical resin body 62. The terminal 44 of the secondary winding 42 is connected to an annular flange 90a made of copper or the like attached to the upper end of the cylindrical resin body 62 and the center post 64 is in contact with the flange 90a. The primary windings 48 and 49 are connected in series by placing the terminals 50 and 52 in contact with a tube 91 or copper or the like attached to the inner surface of the cylindrical resin body 58. The terminal 53 of the primary winding 49 is connected to an annular flange 91a made of copper or the like attached to the lower end of the cylindrical resin body 58 and the center post 64 is in contact with the flange 91a. The terminal 44 of the secondary winding 42 is then in metallic contact with the terminal 53 of the primary winding 49 through the flange 90a, center post 64 and flange 91a.

Figure 8:
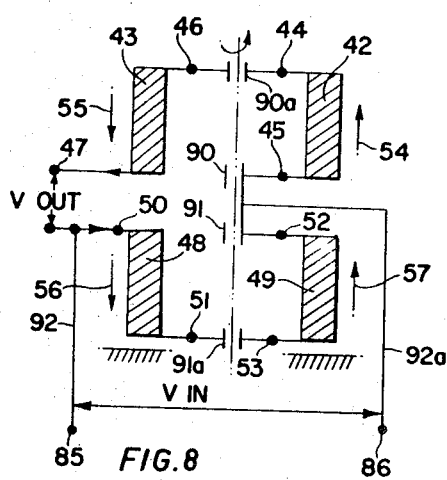
FIG. 8 is a schematic diagram showing the field windings galvanically connected in a control device to control voltage.
Figure 9:
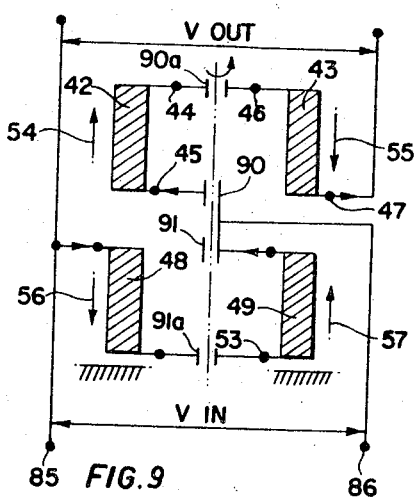
FIG 9 is a schematic diagram showing the field windings in a 180° position from that shown in FIG. 8.

To control voltage, the terminals of the primary and secondary field windings are galvanically connected as shown in FIGS. 8 and 9. The tubes 90 and 91 are placed in contact. The input voltage $V_{IN}$ is connected to the primary field windings by connecting the input terminal 85 to the terminal 50 of the primary field winding 48 by a line 92 and the input terminal 86 to the copper tube 91 and terminal 52 of the primary winding 49 by a line 92a. The primary field windings 48 and 49 are connected in series by connecting terminals 51 and 53 to the annular flange 91a. The secondary field windings 42 and 43 are connected in series by connecting terminals 44 and 46 to the annular flange 90a. The secondary field windings are connected in series with the primary field windings by connecting terminal 45 of the field winding 42 to the tube 90 which is in contact with the tube 91. The output voltage $V_{OUT}$ is between the terminal 47 of the secondary field winding 43 and the terminal 50 of the primary field winding 48.

The iron cores 21 and 22 have circular cross-sections and at the polar surfaces 28, 29, 35 and 36, the circular cross-sectional areas are identical. When the iron cores 21 and 22 are assembled in the juxtaposed relationship, the polar surfaces 28, 29, 35 and 36 in contact lie in a plane disposed transversely to the common axis 41. In this position, the outer and inner edges 37 and 38 and of adjacent polar surfaces 28, 32 and 29, 26 are aligned. When the polar surfaces are completely in contact, the end edges 39 and 40 of the adjacent polar surfaces are also aligned and the maximum number of magnetic flux lines are permitted to close through iron.

When the rotating iron core 21 is rotated relative to the stationary iron core for mutual angular displacement around the common axis 41, the semi-cylindrical legs and the circular cross-sectional area of the polar surfaces ensures that the contact area of the polar surfaces is not appreciably decreased and most of the magnetic flux lines are permitted to still close through iron. A portion of each polar surface is over an air space between the adjacent end edges of the polar surfaces on the same iron core but the contact area is only decreased by approximately five percent in any angularly displaced mutual position of the iron cores 21 and 22 about the common axis 41. The outer and inner edges 37 and 38 are always aligned thus providing that the maximum contact area is provided between polar surfaces for magnetic flux lines between the iron cores 21 and 22.

The circular cross-section of the cylindrical iron cores 21 and 22 also provides that all points on the outer edges 37 of the polar surfaces are an equal distance away from the common axis 41.

Complete regulation of a core type transformer can be attained by connecting the secondary field windings 42 and 43 on the rotating iron core 21 inductively or galvanically with the primary field windings 48 and 49 on the stationary iron core 21. If the secondary windings are only inductively coupled to the primary windings, a complete range of control is obtained with a 90° rotation of the rotating iron core 21 relative to the stationary iron core 22. In the minimum position, the output voltage at the terminals 44 and 46 of the secondary field windings 42 and 43 respectively is generated in the secondary field winding by induction. The voltage in the secondary windings is equal to the input voltage at the terminals 51 and 53 of the primary field windings 48 and 49 respectively. When the iron core 21 is rotated 90° relative to the stationary iron core 22, the rotating iron core 21 closes the main magnetic flux lines entirely and there is no output voltage generated from the field windings 42 and 43 by induction.

If the primary and secondary windings are galvanically connected to control voltage, a complete range of control is obtained with 180° rotation. In the minimum position shown in FIG. 9, the primary and secondary windings are working against one another giving a zero voltage at the output terminals 45 and 52. After the 90° rotation, the main magnetic flux is closed through the rotating iron core 21 and no voltage is generated in the secondary field windings 42 and 43 by induction. The current flowing through the primary and secondary windings is at a maximum and the primary voltage appears at the output terminals 47 and 50. As the rotating iron core 21 is rotated from the 90° position to the 180° position (maximum position) the primary and secondary windings begin to work together and a voltage is gradually induced into the secondary windings 42 and 43 which is added to the primary voltage at the terminals 47 and 50. The maximum voltage is attained at the 180° position shown in FIG. 8.

If the number of turns in the secondary windings 42 and 43 is equal to the number of turns in the primary windings 48 and 49, then the voltage at the output terminals 47 and 50 will be double the input voltage at the input terminals 85 and 86. Therefore, with the primary and secondary windings galvanically connected, a voltage control is possible from zero value to double the input voltage.

In operation, to control amperage through the galvanically connected field windings on a core type transformer, the primary and secondary windings are connected as shown in FIG. 6. The current comes in at terminal 46 of the secondary field winding 43 flows through the primary and secondary field winding and out at terminal 51 of the primary field winding 48. The induced fields in the secondary windings are opposite to the fields of the primary field windings and cancel each other. The current flowing through primary and secondary field windings is at a maximum with no induced voltages being formed in the primary and secondary field windings. When the rotating iron core 21 is rotated 180° relative to the stationary iron core 22 to the position shown in FIG. 7, the induced fields are aiding one another. The reactance is at a maximum and the current flowing through the primary and secondary field windings is at a minimum under constant load conditions. Between the maximum and minimum positions, a linear control of the amperage is possible.

Figure 5:
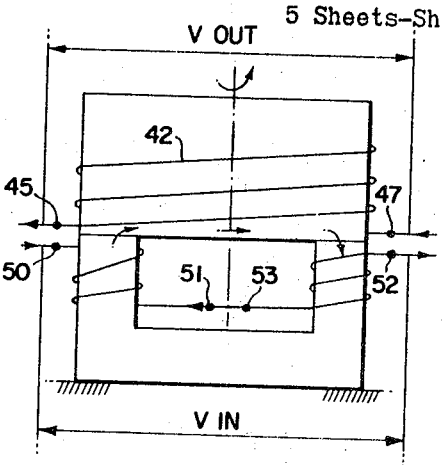
FIG. 5 is a schematic diagram of the field windings and the core members shown in a 90° rotated position from the position shown in FIG. 4.

To control voltage to a load, the primary and secondary field windings may be inductively coupled as shown in FIGS. 4 and 5 or galvanically connected as shown in FIGS. 8 and 9. With the primary and secondary windings inductively coupled, the output voltage at the terminals 45 and 47 generated in the secondary field windings 42 and 43 by induction is equal to the input voltage at the terminals 50 and 52 of the primary field windings 48 and 49. When the rotating iron core 21 has been rotated 90° relative to the stationary iron core 22, the rotating iron core 21 closes the main magnetic flux lines entirely and there is no output voltage generated from the secondary field windings 42 and 43 by induction.

When the primary and secondary fields are galvanically connected as shown in FIG. 9, the primary and secondary field windings are working against each other and cancel out each other. Thus zero voltage appears between the output terminals 47 and 50 of the field windings. By rotating the rotating iron core 21 from the minimum position to the 90° position the main flux closes here and there is no induced voltage in the secondary field windings. However, the entire primary voltage appears at the output terminals 47 and 50 of the field windings.

When the rotating iron core 21 is rotated from the 90° position to the 180° position relative to the stationary iron core 22, a voltage is induced in the secondary field windings to add to the voltage in the primary field windings. At the 180° position a voltage equal to the input voltage is generated in the secondary field windings and this is added to the primary voltage inserted so that an output voltage is obtained at the output terminals 47 and 50 which is double the input voltage. Between the minimum and maximum positions, a linear control of the voltage is possible.

It should be noted that in manufacturing the rotating and stationary iron cores 21 and 22 they should preferably be stress annealed so that the cores will hold their desired shape when used in the transformers 20. The cores 21 and 22 are stress annealed by subjecting them to heat at a temperature of 800° centigrade for a period of four hours.

In order to increase the contact area of adjacent polar surfaces to reduce the hum noise in the transformer 20, a first pair of semi-annular iron bodies 93 and 94 preferably made of laminated high grade silicon steel or the like are embedded in the cylindrical resin body 58 and placed in contact with the outer curved surfaces 37 of the semi-cylindrical legs 32 and 33 of the stationary iron core 22. The upper ends of the semi-annular bodies 93 and 94 are positioned above the polar surfaces 35 and 36 of the legs 32 and 33 to permit the polar surfaces 28 and 29 of the legs 25 and 26 of the rotating iron core 21 respectively to make contact with the adjacent polar surface on the stationary iron core 22 while the outer surfaces 37 of the legs 25 and 26 are placed in contact with the semi-annular iron bodies 93 and 94.

The iron bodies 93 and 94 increase the depth of the rotating and stationary iron bodies 21 and 22 in the region of the polar surfaces 28, 29, 35 and 36 to permit the magnetic flux lines to close through iron. If desired, a second pair of semi-annular bodies 95 and 96 preferably made of laminated high grade silicon steel or the like may be placed in contact with the inner curved surfaces 38 of the semi-cylindrical legs in the same plane as the first pair of semi-annular iron bodies 93 and 94 to increase the depth of the rotating and stationary iron bodies 21 and 22 in the region of the polar surfaces 28, 29, 35 and 36.

Figure 10:
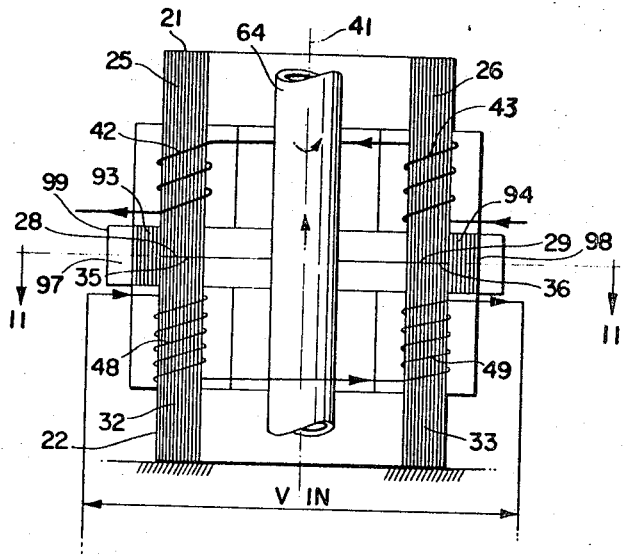
FIG. 10 is a cross-sectional view of an alternate embodiment of the invention for use in the field of arc welding.
Figure 11:
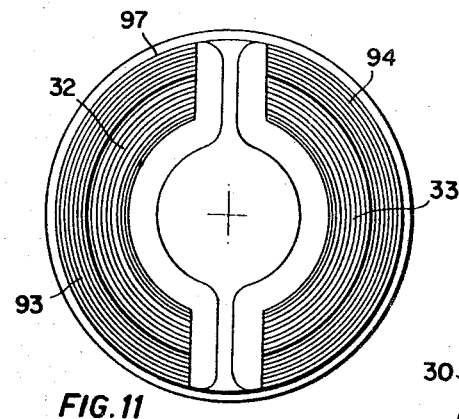
FIG. 11 is a cross-sectional view taken along the line 11—11 of FIG. 10.
Figure 12:
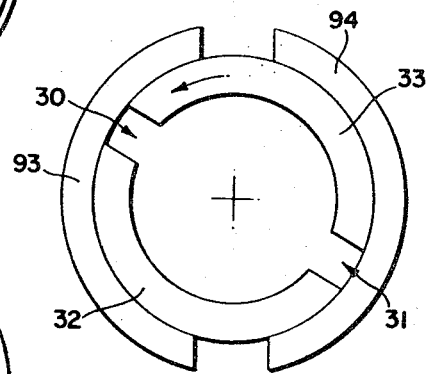
FIG. 12 is a view similar to FIG. 11 but showing the core members rotated relative to the semi-annular bodies.

Another embodiment of the invention is shown in FIG. 10, where the transformers 20 can be used in the field of arc welding. It is desirable to have a control device according to the invention which permits an operator to control current and voltage from a single transformer. For manual arc welding a drooping voltage-amperage characteristic curve with the voltage being the ordinate and the amperage being the abscissa, is desired where an operator can control the welding amperage. When the amperage is zero, the voltage is called an open-circuit voltage. For automatic or machine arc-welding, the characteristic voltage-amperage curve, is a very flat curve where the operator can control the voltage and current.

The transformer 20 with the primary and secondary field windings inductively coupled as previously described is suitable for use in arc welding, but is improved with the following alterations. The outer semi-annular iron bodies 93 and 94 are not embedded in the cylindrical resin body 58 but are rotatably held between the cylindrical resin bodies 58 and 62 in their juxtaposed relationship. A cylindrical lug 97 made of resin or the like is connected to an outer surface 98 of the semi-annular bodies 93 and 94 and extends out from the cylindrical resin bodies 58 and 62 to permit an operator to hold a free end 99 of the lug 97 and manually rotate the semi-annular bodies 93 and 94. With a larger transformer 20 preferably the semi-annular bodies 93 and 94 will be rotated by a worm gear (not shown) from an electric drive mechanism (not shown) engaging a semi-threaded portion (not shown) on the free end 99 of the lug 97.

Figure 13:
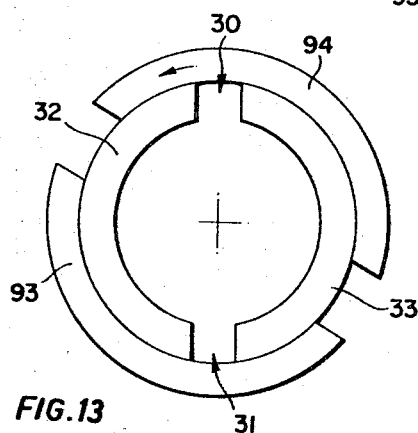
FIG. 13 is a view similar to FIG. 12 showing the semi-annular iron bodies rotated 60° from the position shown in FIG. 11.

In operation for manual arc welding, the operator connects up the load 80 to the output terminals 45 and 47 of the secondary field windings 42 and 43 and connects the electrical source 89 to the input terminals 50 and 52 of the primary field windings 48 and 49. To alter the welding amperage desired, the semi-annular bodies 93 and 94 are rotated in relationship to the rotating and stationary iron bodies 21 and 22 as shown in FIG. 13. The semi-annular bodies 93 and 94 act as magnetic shunts directing the magnetic flux lines going to the rotating iron core 21 back to the stationary iron core 22.

For automatic arc welding, the operator rotates only the rotating iron core 21 relative to the stationary iron core 22 to obtain the flat characteristic curve. A complete control preferably is obtained between a maximum and minimum position by a rotation of approximately 50 or 60 degrees.

It should be noted that any combination of the characteristic curves mentioned above can be obtained by the operator using a combination of the two procedures. If the operator wishes to operate the transformer 20 in an intermediate position between the maximum and minimum positions, there is no problem of overheating, as the greatest number of magnetic flux lines are closed through iron. Also the operator can adjust the voltage and amperage under constant load conditions and can disconnect the electrical source 89 when working at an intermediate position between the maximum and minimum positions.

Figure 14:
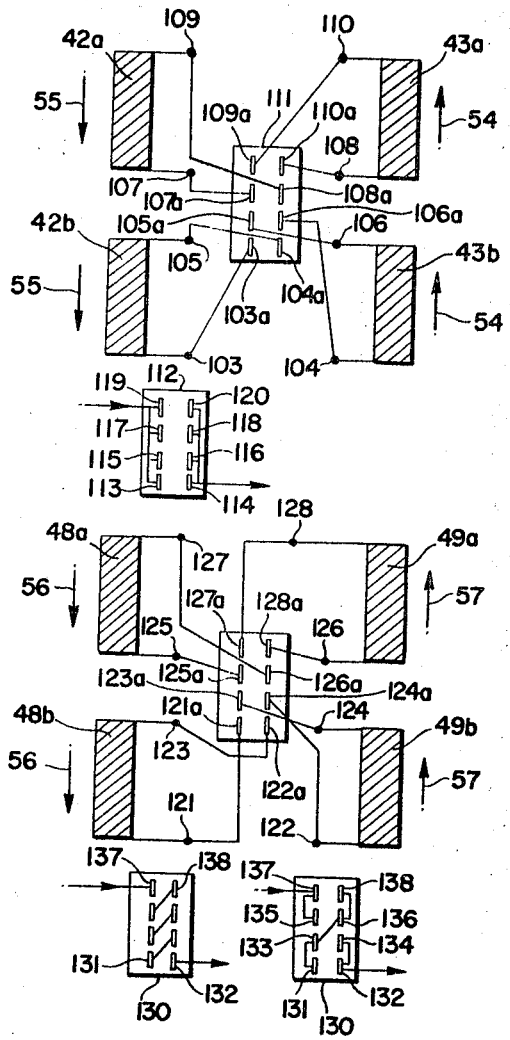
FIG. 14 is a schematic diagram showing the field windings of a low voltage transformer connected to sockets to permit different arrangements of the windings.
Figure 15:
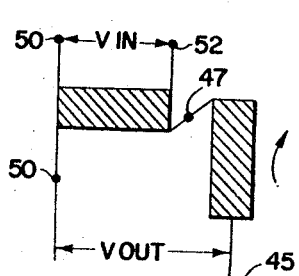
FIG. 15 is a schematic diagram showing the field windings of a limited range transformer to produce an output voltage which is a fixed amount above the input voltage.
Figure 16:
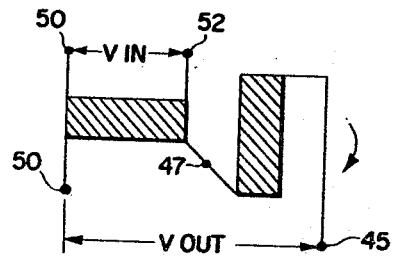
FIG. 16 is a schematic diagram showing the field windings of a limited range transformer to produce an output voltage being a fixed amount below the input voltage.

Another embodiment of the invention is shown schematically in FIGS. 14 to 16 where the transformer 20 can be used with a tap changing system as either a low voltage transformer with an isolated secondary or as a limited range transformer. Known transformers using carbon brushes are limited to the maximum current rating that can be used before the carbon brushes overheat and burn.

As a low voltage transformer, as shown schematically in FIG. 14, the secondary field windings 42 and 43 are inductively coupled to the primary field windings 48 and 49. The copper wire used in the secondary field windings 42 and 43 should be able to carry the maximum current desired. Each secondary field winding 42 and 43 is divided into two coil sections 42a, 42b and 43a, 43b respectively. Each primary field winding 48 and 49 is divided into two coil sections 48a, 48b and 49a, 49b respectively. Tap connections are made at each end of the coil section. The individual coil sections of the primary or secondary field windings are selectively interconnected by a switching means to have the coiled sections connected in series or parallel or a combination of both. Thus in the primary windings different input voltages can be used. Also in the secondary winding three ranges of low voltages can be obtained with the different primary voltages.

For example, eight tap connections 103 to 110 can be made to the secondary coil sections 42a, 42b and 43a and 43b with substantially the same potential difference between adjacent tap connections. The tap connections 103 to 110 are attached to eight female terminals 103a to 110a in a secondary receptacle 111. The tap connections 103 to 110 are attached to the female terminals as follows: tap 103 to 103a; tap 104 to 106a; tap 105 to 104a; tap 106 to 105a; tap 107 to 107a; tap 108 to 110a; tap 109 to 108a; and tap 110 to 109a. A plug 112 with eight prongs 113 to 120 can be inserted in the receptacle 111. The prongs 113 to 120 can be interconnected in different ways to arrange the coil section of the secondary field windings in series or parallel or a combination of both. The plug 112 shown in FIG. 14 has the prongs interconnected in such a manner that the coil sections are connected in parallel.

The primary coil sections 48a, 48b and 49a and 49b have eight tap connections 121 to 128 attached to eight female terminals 121a to 128a in a primary receptacle 129. The tap connections 121 to 128 are attached to the female terminals as follows: tap 121 to 121a; tap 122 to 124a; tap 123 to 122a; tap 124 to 123a; tap 125 to 125a; tap 126 to 128a; tap 127 to 126a; and tap 128 to 127a. A plug 130 with eight prongs 131 to 138 is inserted in the receptacle 129. The prongs can be interconnected in different ways to arrange the primary coil sections in series or parallel or a combination of both to receive one of the three desired input voltages. The two plugs 130 and 130' shown in FIG. 14 are interconnected to arrange the coil sections in series and in combination of series and parallel respectively.

In operation, the operator will insert the correct plug 130 into the primary receptacle 129 for the desired input voltage and also will insert the desired plug 112 into the secondary receptacle 111 for the desired output voltage. Linear control of the output voltage from the secondary winding is possible between zero volts and the maximum output volts through a 90° rotation of the rotating iron core 21 relative to the stationary iron core 22.

An example of using the transformer 20 as a low voltage transformer with an isolated secondary having a maximum 3 k.v.a. rating is set out in the following chart:

| Nominal line voltage | | Output | | |
|---|---|---|---|---|
| Volts | Cycles | Volts | Maximum amplitude | Maximum k.v.a. |
| 120/240/480 | 50/60 | 0–30 | 100 | 3 |
| | | 0–60 | 50 | 3 |
| | | 0–120 | 25 | 3 |

If desired, the rotating iron core 21 can be left in an intermediate position between the maximum and minimum positions without the iron cores overheating. Also, if the transformer 20 is overloaded, say with five times the maximum load the overload capacity of this transformer is such that the maximum time the transformer can be subjected to this overload is over two minutes. Also with repetitive overloads, the transformer need not be turned off for any set length of time as excessive temperature build up is not a problem.

As a limited range transformer, the secondary field windings are galvanically connected to the primary field windings as previously described with reference to FIGS. 8 and 9 to control voltage. It should be noted that the inductively coupled low voltage transformer described hereinbefore can be changed over to a galvanically connected limited range transformer by connecting tap 104 of the secondary field winding 43 to the tap 128 of the primary field winding 49. The copper wire used in the secondary winding must be able to carry the maximum current which will flow through the secondary field windings. The primary windings are also used as a portion of the secondary winding, as the current passing through the primary windings is 180° out of phase with the secondary current generated in the same windings and the resultant current is a value which is less than the secondary current and can be carried by the primary field windings.

A limited range transformer is used by an operator to give a voltage differential which is above and below the value of the input voltage within a predetermined voltage-amperage value. With the primary and secondary windings galvanically connected, the input voltage $V_{IN}$ between terminals 50 and 52 appears as the output voltage $V_{OUT}$ between terminals 50 and 45 increased or decreased by the voltage generated in the secondary field windings. The input voltage can be altered for example between 110 volts to 480 volts by substituting different plugs 130 in the primary receptacle 129 to obtain a limited range transformer having a voltage-amperage rating up to 51 k.v.a. on the same transformer 20.

In operation, the operator inserts the correct plug 130 into the primary receptacle 129 for the desired input voltage $V_{IN}$ to be used. Also, the correct plug 112 is inserted into the secondary receptacle 111 to give the desired control range of voltages about the input voltage. As shown in FIG. 15, the voltage generated in the secondary field windings is aiding the voltage in the primary field windings and the output voltage $V_{OUT}$ in the sum of the two voltages. As shown in FIG. 16, the rotating iron core 22 is rotated 180° relative to the stationary iron core 21 from the position shown in FIG. 15 and the voltage generated in the secondary field windings is working against the voltage in the primary field windings and the output voltage $V_{OUT}$ is the primary voltage $V_{IN}$ minus the voltage generated in the secondary field windings. A linear control range of voltages about the input voltage. As shown minimum positions.

An example of using the transformer 20 as a limited range transformer having a maximum 51 k.v.a. rating is set out in the following chart:

| $V_{IN}$ line voltage | | $V_{OUT}$ | | |
|---|---|---|---|---|
| Volts | Cycles | Volts | Maximum amplitude | Maximum k.v.a. |
| 120 | 50/60 | 90–150 | 100 | 15 |
| 240 | 50/60 | 210–270 | 100 | 27 |
| 480 | 50/60 | 450–510 | 100 | 51 |

It should be noted that the regulation of $V_{OUT}$ is independent of the direction in which the rotating iron core 21 with the secondary field windings is rotated. By a rotation of from 0° to 180° the limited range of output voltage is obtained. The operator can continue to rotate in the same direction going from 180° to 360° and a linear control over the limited range of output voltage is obtained from the maximum to the minimum position.

The foregoing is a description of a preferred embodiment of the invention only. The invention is not to be taken as limited to any of the specific features described, but comprehends all such variations as come within the spirit and scope of the claims.

What I claim is:

1. A welding transformer for continuous adjustment of electric magnitudes by means of variable induction comprising:
   a pair of core members of magnetic or electrical conductive material being of cylindrical shape;
   a pair of notches on opposite sides of each core member defining spaced apart semi-cylindrical legs of the core member joined at one end by a base;
   an exposed end surface on each leg opposite to said base;

at least one field winding on each of said core members;

one of said core members being rotatable relative to the other for mutual angular displacements around a common axis; and a pair of semi-annular bodies of permeable magnetic material arranged opposite to one another and engaging said adjacent legs of said core members, said semi-annular bodies being rotatable relative to said core members whereby adjustment of electric magnitudes is performed by either rotation of one core member relative to the other or the rotation of said semi-annular bodies relative to said core members or a combination of both.

2. A welding transformer as claimed in claim 1, including a pair of cylindrical bodies of resin material or the like, each having one of said core members and one of said field windings embedded therein;

a cylindrical lug of resin material or the like secured to said semi-annular bodies; and mean for holding said cylindrical bodies in a juxtaposed relationship with said cylindrical lug therebetween.

3. A welding transformer as claimed in claim 1, including means for connecting a source of alternating potential to one of said field windings; and means for connecting a load to the other of said field windings.

4. A welding transformer as claimed in claim 1, including means for securely holding one of said core members; and means for rotating said other core member relative to said securely held core member.

5. A welding transformer as claimed in claim 1, including a field winding of kidney shape cross-section and being dimensioned to snugly fit on each leg of said core member; and means for connecting said field windings on each core member in series.

6. A welding transformer as claimed in claim 1, including means for securely holding one of said core members;

a first gear permanently attached to the other of said core members;

a second gear inter-engaging with said first gear; and manually operable means connected to said second gear, whereby an operator is able to rotate said first gear and said core member secured thereto relative to said securely held core member.

7. A welding transformer as claimed in claim 1, wherein said semi-annular bodies act as a magnetic shunt between said core members.

8. A welding transformer as claimed in claim 1, including manually operable means attached to said semi-annular body adapted to permit an operator to rotate said semi-annular body relative to said core members.

9. A welding transformer as claimed in claim 1, including a center shaft and securing means passing through the opening of said cylindrical core members adapted to hold said core members in a juxtaposed relationship while permitting one of said core members to be rotated relative to said other core member.

10. A welding transformer as claimed in claim 1, including a field winding on each leg of said core member; and a hollow center shaft of electrical conducting material adapted to pass through the opening of said cylindrical core members whereby said field windings on the same core member are connected in series therethrough.

References Cited

UNITED STATES PATENTS

| 2,585,050 | 2/1952 | Simon | 336—120X |
|---|---|---|---|
| 2,609,491 | 9/1952 | Kirchner | 336—130X |
| 2,609,531 | 9/1952 | Kirchner | 336—120X |

FOREIGN PATENTS

| 1,517,620 | 2/1968 | France | 336—135 |
|---|---|---|---|
| 275,253 | 8/1951 | Switzerland | 336—120 |

THOMAS J. KOZMA, Primary Examiner

U.S. Cl. X.R.

336—120, 123, 135